United States Patent

[11] 3,589,536

[72] Inventors Winford B. Hickman
  Spokane;
  Gary L. Vanhoff, Veradale; George H. Pettis, Spokane, all of, Wash.
[21] Appl. No. 883,194
[22] Filed Dec. 8, 1969
[45] Patented June 29, 1971
[73] Assignee Atlas Spokane, Inc.

[54] RETRACTING APPARATUS FOR TRAILING SWEEPS
  6 Claims, 2 Drawing Figs.
[52] U.S. Cl. .................................................. 214/10,
  198/171, 214/17 DA
[51] Int. Cl. ..................................................... B65g 65/42
[50] Field of Search .......................................... 214/10, 17
  D, 17 DA; 198/171

[56] References Cited
UNITED STATES PATENTS
3,011,658 12/1961 Peterson .................... 214/17 DA X
3,469,720 9/1969 Peterson .................... 214/17 DA

*Primary Examiner*—Gerald M. Forlenza
*Attorney*—Wells, St. John and Roberts

ABSTRACT: A retracting apparatus for the trailing sweeps of a storage and reclaim system wherein trailing sweep assemblies are dragged in a predetermined path relative to a pile of material. When movement of the sweep assemblies is to be terminated, vertically movable retractors are first operated in a sequence to successively position each retractor in the path of the bucket assemblies. The bucket assemblies are progressively pulled outward of the pile by the continued movement until the pile area is cleared of the bucket assemblies.

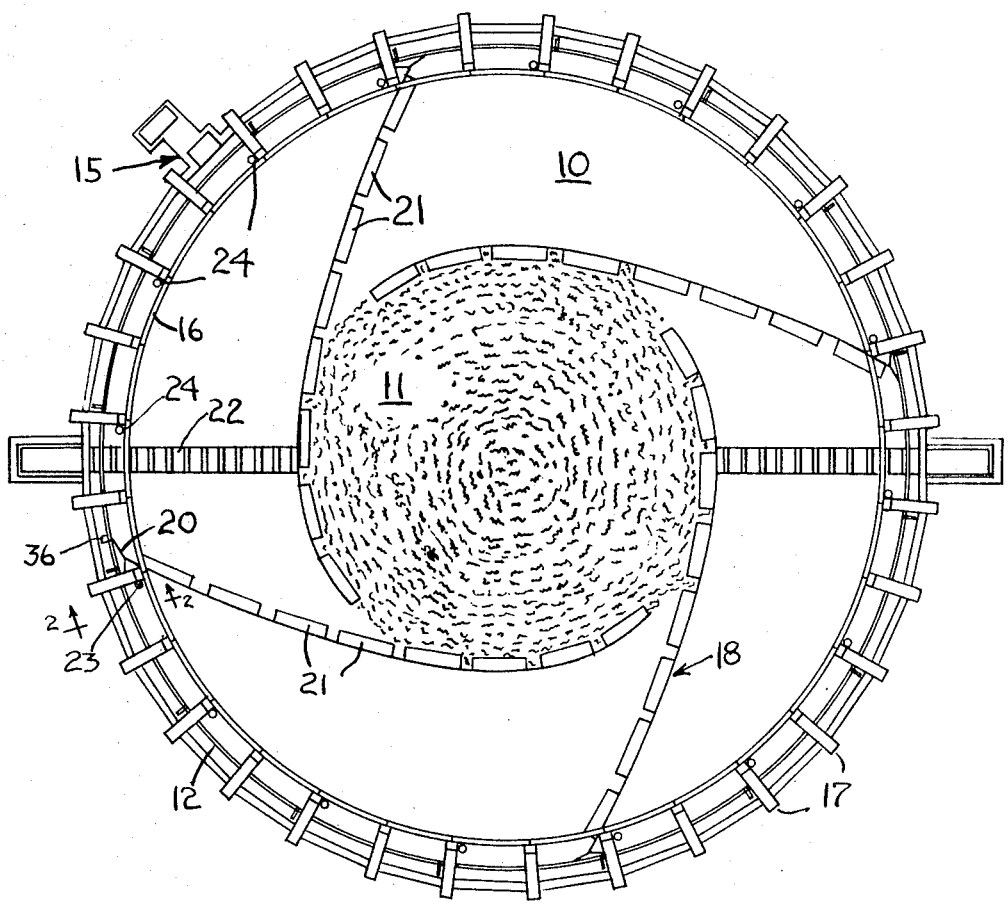

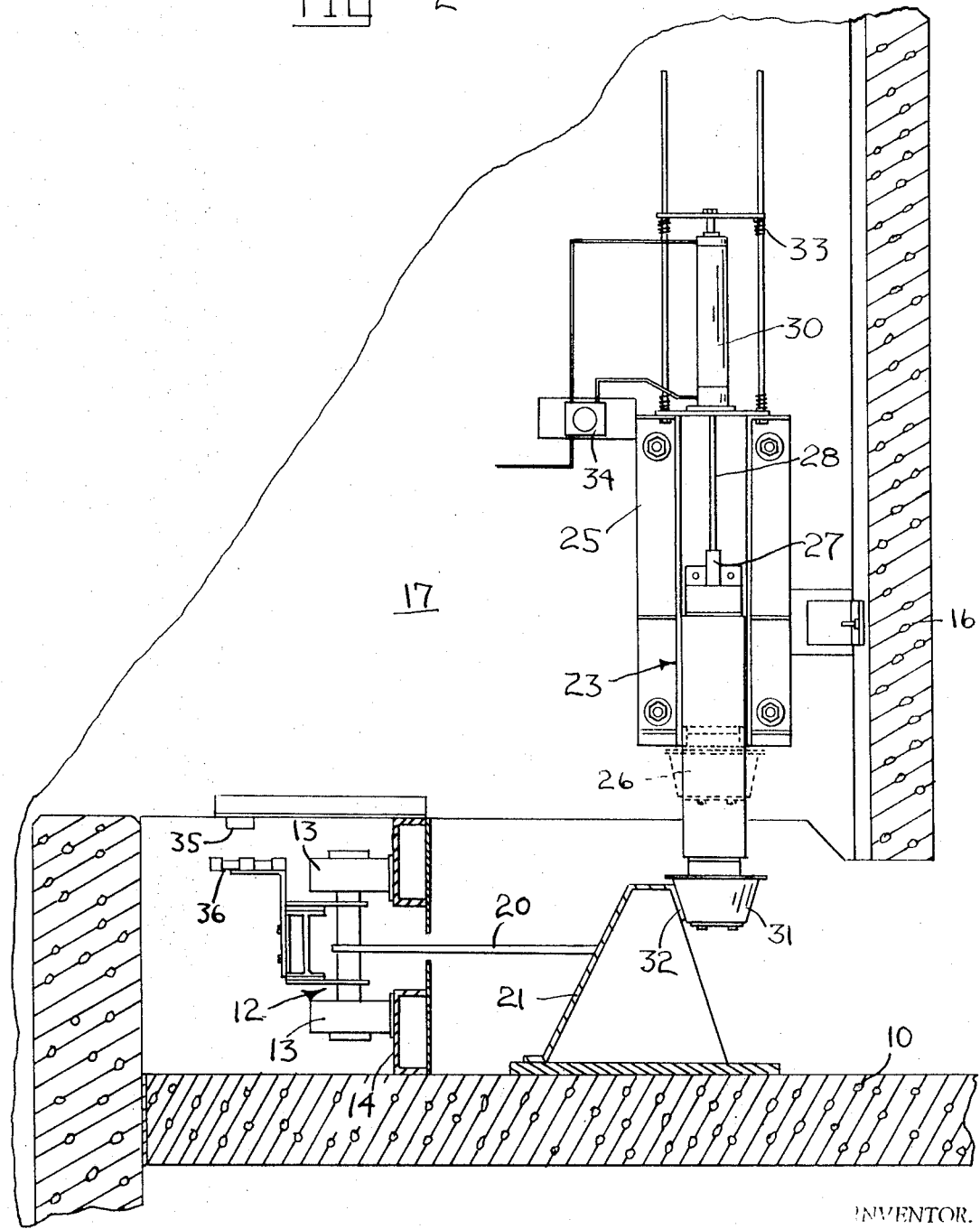

RETRACTING APPARATUS FOR TRAILING SWEEPS

BACKGROUND OF THE INVENTION

The present apparatus relates to the type of storage and reclaim system shown and described inn U.S. Pat. 3,011,658 granted to John L. Peterson. In this apparatus, recovery of bulk material from storage on a supporting slab is accomplished by the rotation of trailing chains of sweep buckets. In a typical installation, three to six sweep assemblies are used. Each sweep assembly is fixed at one end to a powered rotating pull ring that encircles the storage area of the slab. The other end of each sweep assembly is free for trailing. As the pull ring rotates about the periphery of the slab, the sweep chains automatically work toward the center of the slab. The sweep buckets contact the stored materials at the outside of the pile. As the pull ring rotates, the buckets fill and sweep materials through grizzly openings in the slab onto a recessed outfeed conveyor.

One difficulty encountered with such a system is the problem of the bulk material being fed to the apparatus during times when the pull ring is stationary. If this occurs and substantial amounts of bulk material are received on the bucket assemblies, it is sometimes impossible to rotate the pull ring. Attempts to do so may result in damage to the apparatus or failure of various parts of the powered structure. To eliminate this, one presently must either manually pull the buckets clear of the pile area or periodically rotate the ring in a planned sequence during any time in which the ring is stationary.

The present apparatus is designed to facilitate the clearance of the slab by providing a convenient device for pulling the bucket assemblies outward from the pile at any time in which the pull ring is to be stopped. This is accomplished by the progressive lowering of vertical abutments against which the bucket assemblies are pulled by continued rotation of the pull ring in order to change the path of movement of the sweep assemblies from that which they would normally assume when directed inwardly across the slab. The apparatus utilizes the rotation of the pull ring in the usual fashion as the primary source of power for the desired bucket movement.

SUMMARY OF THE INVENTION

The present invention comprises an addition to the previously discussed apparatus. This addition relates to the provision of retractors in the form of movable members engaged by the bucket assemblies adapted to cause the bucket assemblies to trail outwardly from the center of the pile when actuated. The structure of the members abutted by the bucket assemblies can be varied over wide limits, depending upon particular design qualities and structural requirements in the particular installation. The retractors are preferably placed adjacent to the walls that define the horizontal boundaries or outer limits of the pile. They selectively cause the sweep assemblies to be moved outside the pile boundaries in response to continued rotation of the pull ring to which they are attached. The power required for such movement is minimized by progressively moving the sweep assemblies in a sequence by actuating the retractors one at a time. The apparatus is capable of being fully automated in order to be actuated at anytime that the pull ring is stopped.

It is a first object of this invention to provide a retractor assembly for the storage and reclaim system which does not interfere with normal operation of the system during reclaiming of bulk material stored therein.

Another object of the invention is to provide a convenient apparatus for moving the sweep assemblies clear of the pile in a sequential operation which can be actuated without specific indexing of the apparatus or preconditioning of the machinery. The ring can be stopped at any time and the present structure put into operation immediately prior to final stoppage.

Another object of the invention is to provide a retractor assembly which can be utilized with reclaiming systems of any diameter and using any number of sweep assemblies about the pull ring. Description of the Drawings FIG. 1 is a top plan view showing a reclaim system equipped with the present invention; and FIG. 2 is an enlarged vertical sectional view taken along line 2-2 in FIG. 1 and showing the engagement of a bucket assembly by the primary retractor. DESCRIPTION OF THE PREFERRED EMBODIMENT The general arrangement of the storage and reclaim system as shown in FIGS. 1 and 2 is similar to that described more completely in U.S. Pat. No. 3,011,658 to Peterson. These elements include a floor or slab 10 on which the pile of material 11 is supported. The pile 11 is normally conical in shape and is generally centered with respect to the slab 10.

Mounted about the periphery of the supporting slab is a rotatable pull ring 12 made up of one or more segments having rollers 13 which engage a guiding wall structure 14. The pull ring 12 is continuous in structure about the entire periphery of the slab 10. It is powered by a motor-driven unit 15 geared or otherwise connected to the ring 12.

Inward of ring 12 is an upright escape area," 16 which also extends about the entire periphery of slab 10. Wall 16 is coaxial with the pile 11 and with ring 12. It is carried by radial supports 17 which locate the lower edge of the wall 16 at an elevation spaced above the upper surface of the slab 10 (FIG. 2). Wall 16 defines the horizontal boundaries of the pile 11 when pile 11 extends completely across the slab 10. The area on slab 10 between wall 16 and the pull ring 12 is termed an "escape area" since it provides a narrow pathway into which the material within pile 11 cannot enter.

A plurality of flexible sweep bucket assemblies 18 are pivotally connected to the pull ring 12. The outer draw bar 20 and a bucket 21 at the outer end of one assembly 18 are shown in greater detail in FIG. 2. The buckets 21 of each assembly 18 are moved at their outer ends in a circular path due to the rotation of pull ring 12. Their remaining inner ends are free for trailing, and tend to sweep across the slab 10 and engage the periphery of pile 11 in a manner shown in FIG. 1. As each bucket 21 engages the pile 11, it pulls material from the pile and drags this material about the slab 10. Outfeed conveyors are recessed beneath the slab 10, and the material pulled along by buckets 21 is dropped through grizzly bars at 22 into the outfeed conveyor apparatus.

All of the above apparatus is described and shown in U.S. Pat. No. 3,011,658. It is mentioned here as background for an understanding of the present modification. The instant disclosure is related to an apparatus adapted to mechanically pull the sweep bucket assemblies 18 away from the periphery of pile 11 and into the escape area outward of the wall 16. This is essential when the pull ring 12 is to be stopped and material might be delivered to the pile. If the sweep bucket assemblies 18 were to remain inward of wall 16, the bulk and weight of material on them might prevent their later removal and subsequent operation without serious mechanical failure.

To accomplish this result, there is added to the basic structure a series of retracting devices located about the periphery of the apparatus. The location of these devices is shown by example in FIG. 1 as being on the upper supports 17 that carry wall 16. In FIG. 1 a primary retractor is indicated at 23 and a number of secondary retractors are equally spaced about the structure and are indicated by the numeral 24. The retractors 23, 24 might be identical to one another, although the secondary retractors 24 need not have the structural capacity of the primary retractor 23.

As seen in FIG. 2, the primary retractor 23 includes a mounting bracket 25 fixed to the support 17 and vertically guiding a shaft 26. The upper end of shaft 26 is connected by a clevis 27 to the lower end of a piston rod 28 that is part of a hydraulic cylinder assembly 30. The lower end of shaft 26 rotatably journals a roller 31 that is complementary to an inward lip 32 that extends along the length of each bucket 21.

When in its lowered position, as shown in full lines in FIG. 2, roller 31 will be engaged by the lip 32 of each bucket 21 as the sweep bucket assemblies 18 are pulled across the retractor 23. This will result in the buckets being moved outwardly from pile 11 and being located outward of the wall 16. The secondary retractors shown at 24 merely serve to maintain this position of each bucket assembly after it has been attained by contact with the retractor 23. The details of retractors 23, 24 can be widely varied. As shown, the cylinder assembly 30 is assisted in upward movement by compression springs 33, which help to offset the weight of the shaft 26 and devices attached thereto. The drawing illustrates a hydraulic valve at 34 used to control the elevation position of the roller 31 by control of the cylinder assembly 30.

Valve 34 might be controlled by an electrical system utilizing a magnetically operated switch 35 that is actuated by passage of a magnet 36 located on ring 12 adjacent to the sweep bucket assembly 18. A single magnet 36 located at the connection end of one sweep bucket assembly 18 can be used to successively trip the switches 35 about the periphery of the structure during one revolution of ring 12 prior to stopping the rotation of ring 12. In this way, the apparatus is easily programmed to sequentially lower the retractors 23, 24 during a full revolution of ring 12 so that only a single sweep bucket assembly 18 will be in the act of being pulled from the pile 11 at any time. This minimizes the power necessary to move the sweep bucket assemblies outward and also insures proper removal of the sweep bucket assemblies regardless of the angular orientation of the structure at the time such action is initiated.

Various control systems common to this and other industries may be used to operate the retractors 23, 24. The essential element in this combination is the addition of movable devices that lie in the path of the buckets 21 so that the buckets are forced beyond the boundary wall 16 and thereby removed from the pile area. Such devices can be manually or automatically controlled.

The instant invention has been described as an addition to the specific material handling apparatus in circular form about a central pile. It is equally applicable to the retracting of sweep assemblies pulled about paths having other peripheral shapes than circular (oval, rectangular). It also can be used to retract sweeps that move along partial arcuate paths on reclaiming devices movable toward or away from the pile. Generally speaking the retractors can be located on a fixed or movable support for trailing elements such as sweep assemblies, which diverge progressively from the path of movement of a lead pivot moved along a predetermined path relative to a pile of material.

Many details of this structure can be modified without deviating from the basic element of providing retractors in the general manner discussed above. Such modifications and substitution of equivalent devices is believed to be within the skill of those in this art.

Having thus described my invention, I claim:

1. In an apparatus for reclaiming bulk material of the type comprising:
    a slab having an upwardly facing top surface upon which a bulk material pile is supported;
    an upright wall spaced upwardly from the slab adjacent to the pile;
    a driven member outward of said walls movably mounted about a predetermined path relative to said wall;
    and a pile engaging sweep assembly in the form of an elongated member having a trailing end and having an outer end movably connected to the driven member at a location outward of said wall, said sweep means being at an elevation between that of the slab surface and that of the lower edge of said wall;
    the improvement comprising:
    retractor means movably positioned for placement in the path of the sweep assemblies at a position adjacent to said wall for selectively causing the sweep assemblies to be moved outward of the wall relative to the pile in response to continued movement of the driven member about said path.

2. The apparatus as set out in claim 1 wherein said retractor means comprises:
    a plurality of individual retractors in predetermined locations relative to the wall, said retractors being spaced along the peripheral wall and being selectively movable into the path of the sweep assemblies adjacent to said wall for selectively maintaining the sweep assemblies at a location outward of the wall relative to the pile.

3. The apparatus as set out in claim 1 wherein said retractor means comprises:
    an abutment movably mounted with respect to said wall between a first position clear of the sweep assemblies and a second position intersecting the elevation of the sweep assemblies and inwardly of the moving path of the outer end of each sweep assembly.

4. An apparatus as set out in claim 1 wherein said retractor means comprise vertically movable members mounted inwardly adjacent to said wall and powered by hydraulic cylinders for selective movement between a first position clear of the sweep assemblies and a second position that lies in the path of movement of each sweep assembly during movement of said driven member.

5. In an apparatus for reclaiming bulk material of the type comprising:
    a horizontal slab having an upwardly facing top surface upon which a pile is supported;
    a peripheral upright circular wall spaced upwardly from the slab and defining the horizontal limits of the pile;
    a peripheral circular drive ring extending about the slab; said drive ring being horizontal and coaxial with said wall and being located outwardly of said wall;
    means to rotate said ring about its center axis;
    and a pile engaging sweep assembly in the form of an elongated chain of buckets having a free inner trailing end and an outer end movably connected to the drive ring at a location outward of said wall, said sweep assembly being normally projected between the slab surface and the lower edge of said wall;
    the improvement comprising:
    vertically movable retractors mounted on said apparatus adjacent to said wall for selective movement into the path of the sweep assemblies for causing the sweep assemblies to be moved outside the horizontal limits of the pile in response to continued movement of the drive ring.

6. An apparatus as set out in claim 5 wherein the retractor means comprises a plurality of retractors spaced angularly about said wall;
    and means operatively connected to said sweep assembly for moving each of said retractors into the path of the sweep assembly in a progression about said wall as the sweep assembly moves about the pile in response to continued ring rotation.